United States Patent
Rowland

(10) Patent No.: US 6,412,151 B1
(45) Date of Patent: Jul. 2, 2002

(54) SHOE ORNAMENT LOCKING CLIP APPARATUS

(76) Inventor: Michael Campbell Rowland, 53 Cottonwood La., Dyersburg, TN (US) 38024

( * ) Notice: Subject to any disclaimer, the term of this patent is extended or adjusted under 35 U.S.C. 154(b) by 0 days.

(21) Appl. No.: 09/676,327

(22) Filed: Sep. 29, 2000

(51) Int. Cl.$^7$ ................................................ A43B 23/00
(52) U.S. Cl. ........................ 24/598.4; 24/598.1; 36/136
(58) Field of Search .............................. 36/136; 24/907, 24/600.9, 601.2–601.4, 598.4, 598.1, 601.7–601.9

(56) References Cited

U.S. PATENT DOCUMENTS

| | | | |
|---|---|---|---|
| 396,775 A | * | 1/1889 | Splittstoser |
| 454,034 A | * | 6/1891 | Davis |
| 652,885 A | * | 7/1900 | Brown |
| 3,972,093 A | * | 8/1976 | Aimar |
| 4,697,362 A | | 10/1987 | Wasserman |
| 4,953,268 A | * | 9/1990 | Chang |
| 5,359,790 A | | 11/1994 | Iverson |
| 5,361,460 A | * | 11/1994 | Pan |
| 5,596,821 A | | 1/1997 | Solo |
| 5,624,094 A | * | 4/1997 | Protz, Jr. |
| 5,673,499 A | | 10/1997 | Attilieni |
| 5,673,501 A | | 10/1997 | Mathews |
| 5,800,900 A | * | 9/1998 | Mitchell |

* cited by examiner

Primary Examiner—James R. Brittain

(57) ABSTRACT

This device is an improvement of a shoe ornamentation system. The improvement provides a means of attaching removable ornamentation that is resistant to accidental dislodgment, and the ornamentation may be attached to virtually any part of the shoe, including the heel and toe regions of the shoe upper. The device is composed of a detachable locking clip that has the shoe ornament affixed to it, and a bar, the center of which the locking clip attaches. The ends of the bar are fastened to the shoe at the time the shoe is manufactured.

3 Claims, 7 Drawing Sheets

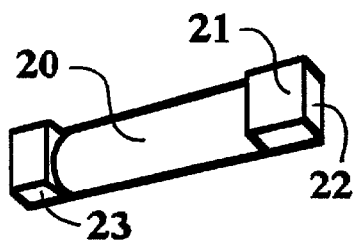
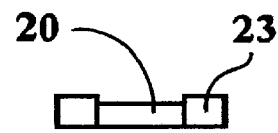
Fig. 7　　　　　　　Fig. 8
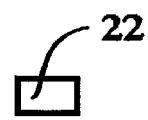
Fig. 9　　　　　　　Fig. 10
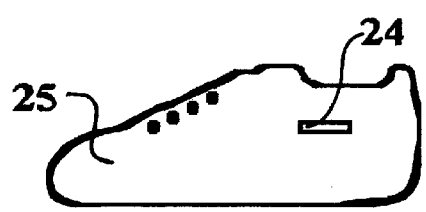
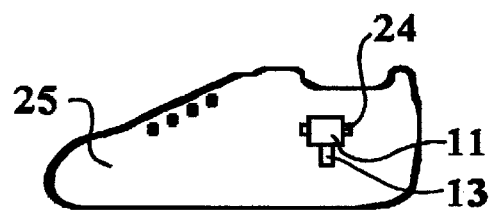
Fig. 11　　　　　　Fig. 12

SHOE ORNAMENT LOCKING CLIP APPARATUS

CROSS REFERENCE TO RELATED APPLICATIONS

An application entitled "Shoe Ornament Locking Clip Apparatus" a design patent application, Ser. No. 29/130,475, was filed Sep. 29, 2000.

STATEMENT REGARDING FEDERALLY SPONSORED RESEARCH OR DEVELOPMENT

Not Applicable

REFERENCE TO MICROFICHE APPENDIX

Not Applicable

BACKGROUND OF THE INVENTION

Shoe ornamentation in the past has been largely limited to permanently affixed designs. Of the few designs that involve detachable ornamentation, those using snaps or hook and pile fasteners have the potential to be too easily detached by brushing the ornament against another object such as another shoe when the person wearing the shoe crosses his or her legs while sitting. Those designs attaching the ornamentation to the shoestrings are limited to displaying the ornamentation to the front of the shoe upper. None of the prior art listed below offer a removable locking clip and bar mechanism that has the inherent benefits of resisting accidental dislodgment of the shoe ornamentation and the flexibility of being placed virtually anywhere on the shoe upper, depending upon the manufacture of the shoe.

Prior art related to this application includes a novelty shoe with detachable ornamental article by Mathews (U.S. Pat. No. 5,673,501 filed Mar. 18, 1996) where the ornaments snap to the shoe, as opposed to using a locking clip and bar as in my design.

Attilieni (U.S. Pat. No. 5,673,499 filed Aug. 4, 1994) described a light emitting device which was attached to the tongue of the shoe where only an overlying transparent decorative element was detachable.

Solo (U.S. Pat. No. 5,596,821 filed Jun. 21, 1995) depicts a utility article that rests on top of the shoe upper and attaches to the top of the shoe, yet there is no mention of a locking clip mechanism, nor the possibility of the article being able to be attached to the back of the shoe.

Iverson (U.S. Pat. No. 5,359,790 filed Aug. 6, 1993) has a shoe with individualized display areas, but the indicia is attached to the display area by adhesive.

Wasserman (U.S. Pat. No. 4,697,362 filed Dec. 30, 1985) describes a removable indicia for footwear employing a hook and pile fastening means recessed into the sole of the shoe.

Not one of these prior inventions uses the combination of a specially shaped bar and detachable locking clip for the placement of removable ornaments on a shoe.

BRIEF SUMMARY OF THE INVENTION

The present invention solves the aforementioned problems of accidental detachability and location of shoe ornamentation by providing a device that allows the ornamentation to be securely fastened to the shoe anywhere a bar is located on the shoe.

The device is a locking clip made of a flexible material that attaches to a uniquely shaped bar, the ends of the bar being suitably fastened to the shoe. The shoe ornament is mounted on the locking clip by adhesives or other suitable means.

The shoe ornament locking clip apparatus is a unique combination of a semi-permanent locking clip that attaches to a bar which has a flat surface on one side and a pair of outwardly sloping surfaces on the opposite side of the bar. The ends of the bar are mounted to the shoe. The shoe ornament is attached to the locking clip which in turn clips to the center of the bar.

The shoe ornament with locking clip provides for a quick, simple way to attach an ornament to a shoe that resists accidental removal of the shoe ornament by bumping or scraping of the shoe during normal day-to-day activities. This is accomplished through the unique combination of components. Unlike some of the prior art, the locking clip can be placed on virtually any part of the shoe upper, the location possibilities limited only by the shoe manufacturer. Secondly, the ornament that is attached to the locking clip can be virtually any shape or size.

BRIEF DESCRIPTION OF SEVERAL VIEWS OF THE DRAWING

FIG. 7 is a prospective view of the bar showing the sloping surface that faces the shoe, the ends of said bar are normally attached to the shoe upper, and over the center of said bar the locking clip attaches.

FIG. 8 is a side view of the bar.

FIG. 9 is a view from the back of the bar.

FIG. 10 is a view from one end of the bar.

FIG. 11 is a view showing the side of a shoe with the bar attached to it.

FIG. 12 is a view showing the side of a shoe with the shoe ornament locking clip apparatus, minus any shoe ornament, attached to the bar.

DETAILED DESCRIPTION OF THE INVENTION

Figure 1:
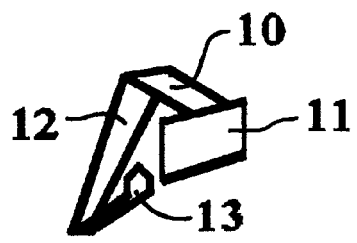
FIG. 1 is a prospective view of the shoe ornament locking clip with the clip slightly open to show it more clearly.
Figure 2:
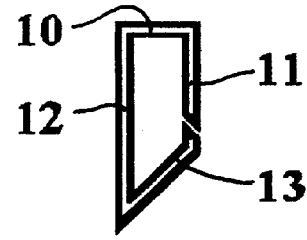
FIG. 2 is a side view of the shoe ornament locking clip.
Figure 3:
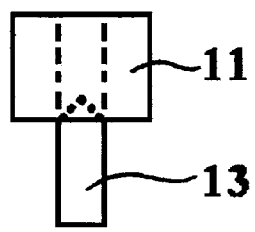
FIG. 3 is a front view of the shoe ornament locking clip.
Figure 4:
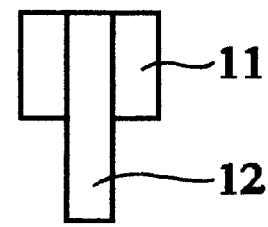
FIG. 4 is a view from the back of the shoe ornament locking clip.
Figure 5:
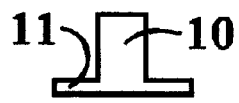
FIG. 5 is a view from the top of the shoe ornament locking clip.
Figure 6:
FIG. 6 is a view from the bottom of the shoe ornament locking clip.
Figure 13:
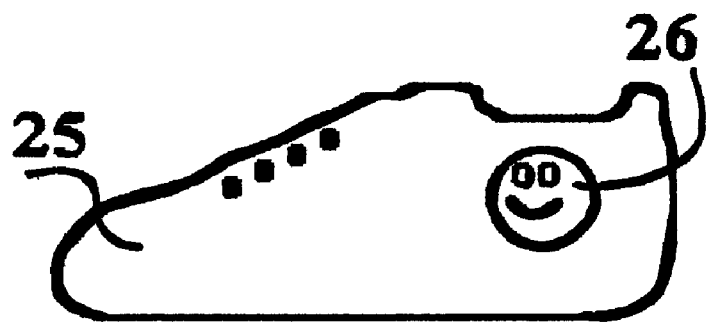
FIG. 13 is a view showing the side of a shoe with an ornament attached to the shoe via the locking clip apparatus clipped to the bar and the locking clip apparatus being fixed to the reverse side of the ornament.
Figure 14:
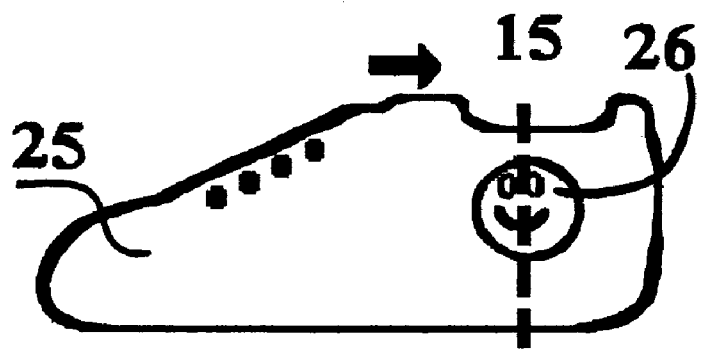
FIG. 14 is a view showing from where the cross section view of the shoe ornament locking clip apparatus is to be viewed starting with FIG. 15.

The primary components of the invention are the locking clip as seen in FIG. 1 and FIG. 2 and the bar as seen in FIG. 7. FIGS. 3, 4, 5, and 6 show the front, back, bottom and top views, respectively, of said locking clip. FIGS. 8, 9, and 10 show the side, back, and end views, respectively, of said bar. FIG. 11 depicts the side view of what a shoe may look like after it has just been manufactured with said bar in place. FIG. 12 represents said locking clip, without an ornament, attached to said bar on said shoe in FIG. 11. FIG. 13 then presents an example of the appearance of a shoe with an ornament attached to said shoe via said locking clip device. FIG. 14 then shows from what direction the cross section figures, FIGS. 15 through 18, are to be viewed.

Figure 15:
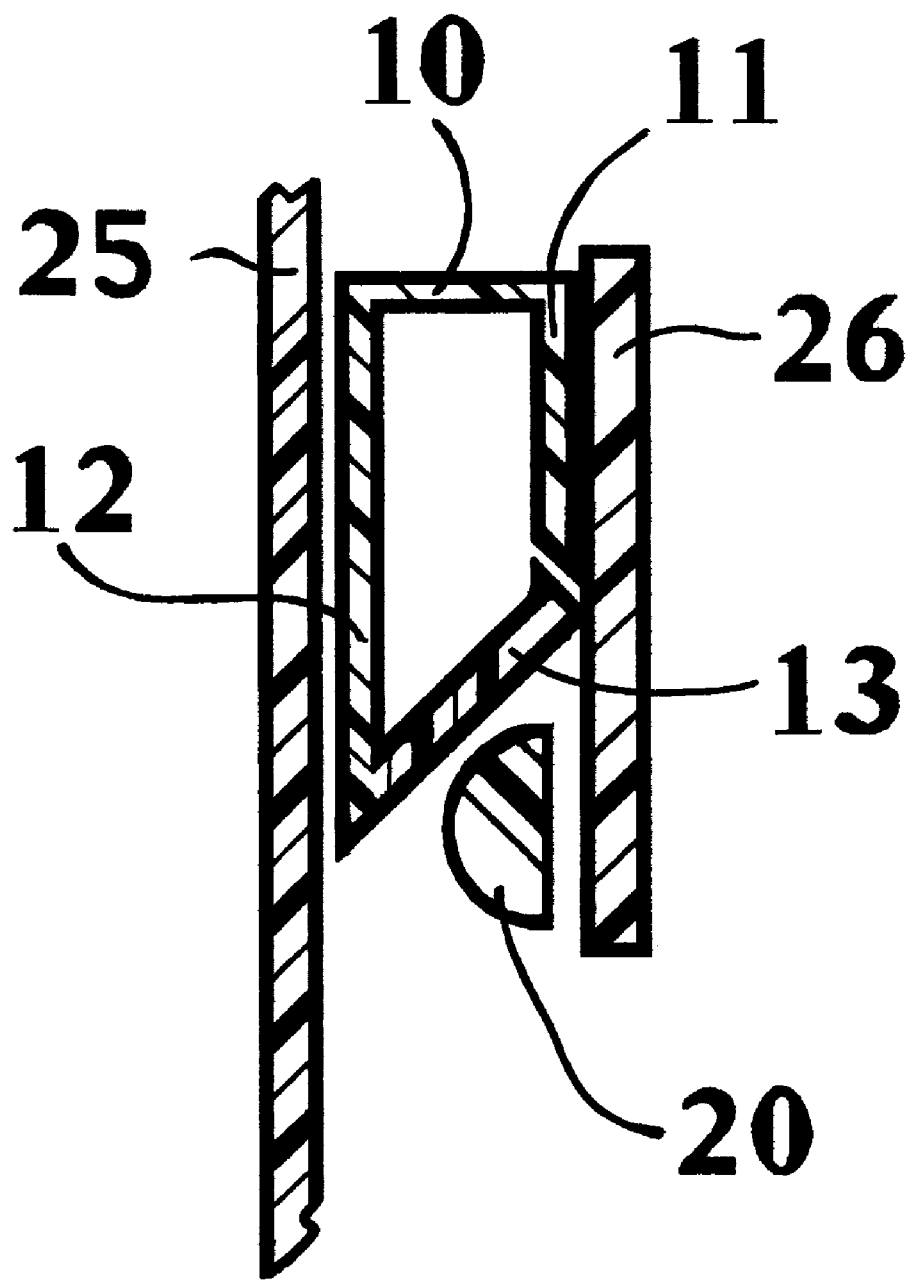
FIG. 15 is a cross section view of the shoe ornament locking clip apparatus from FIG. 14 showing the locking clip just prior to contacting the bar.

Referring to FIG. 1, the shoe ornament locking clip is shown here as a prototype with a front 11 onto which an ornament 26 in FIG. 15 can be attached by suitable means.

Figure 16:
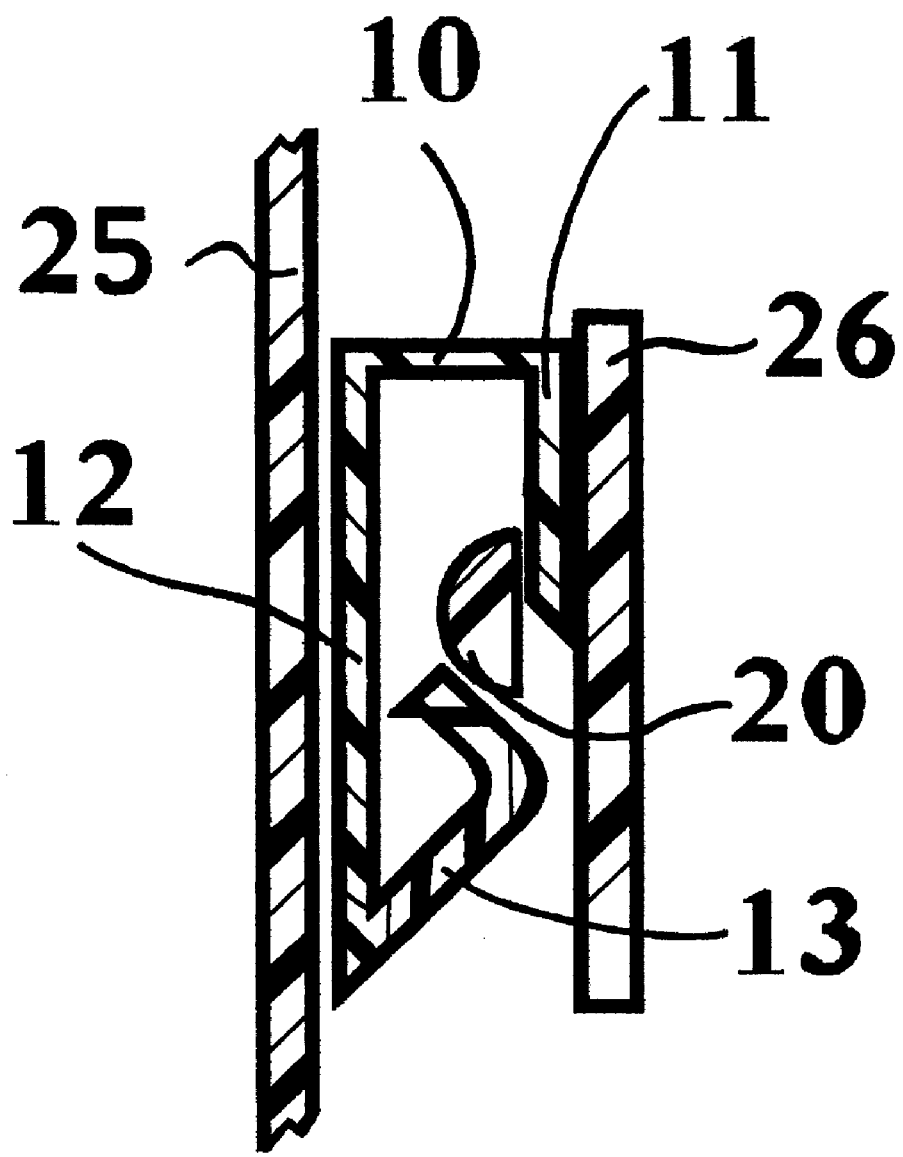
FIG. 16 is a cross section view of the shoe ornament locking clip apparatus from FIG. 14 showing the flexible bottom piece of the locking clip coming in contact with the center of the bar as one slides the shoe ornament onto the bar.
Figure 17:
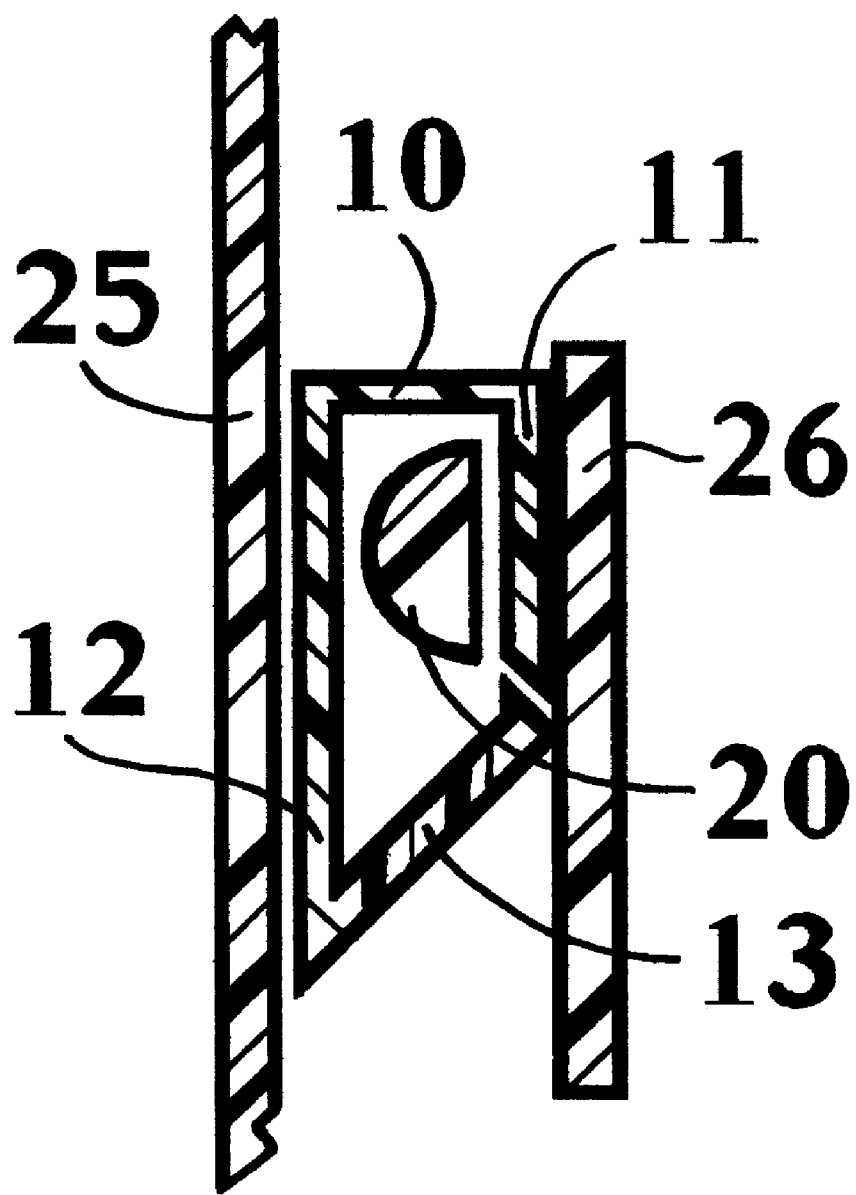
FIG. 17 is a cross section view of the shoe ornament locking clip apparatus from FIG. 14 showing the locking clip locked on to the center of the bar; the ends of said bar are attached to the shoe.

As seen in FIG. 16 the top side 10 is just slightly greater in depth than the thickness of the sloping surface 20 in the middle of said bar plus the thickness of the flexing side 13 of said clip. Said depth of the top side 10 allows said clip to flex side 13 while sliding the back side 12 between the sloping surface 20 on the front center of said bar and the shoe 25, as the front side 11 with the ornament 26 slide over the center of the back 24, in FIG. 9, of said bar. The preferred embodiment of said locking clip would be to make said clip of a flexible material such as metal or plastic so that said clip can spring back into position and lock said clip into place as seen in FIG. 17. Similarly, FIG. 17 reveals that said clip cannot slide further due to said top 10 blocking further downward motion, and said clip cannot easily be pulled back up over said bar because said bar would push against the flexible side 13 of said clip, forcing the flexible side 13 against said front side 11 and said ornament 26.

Figure 18:
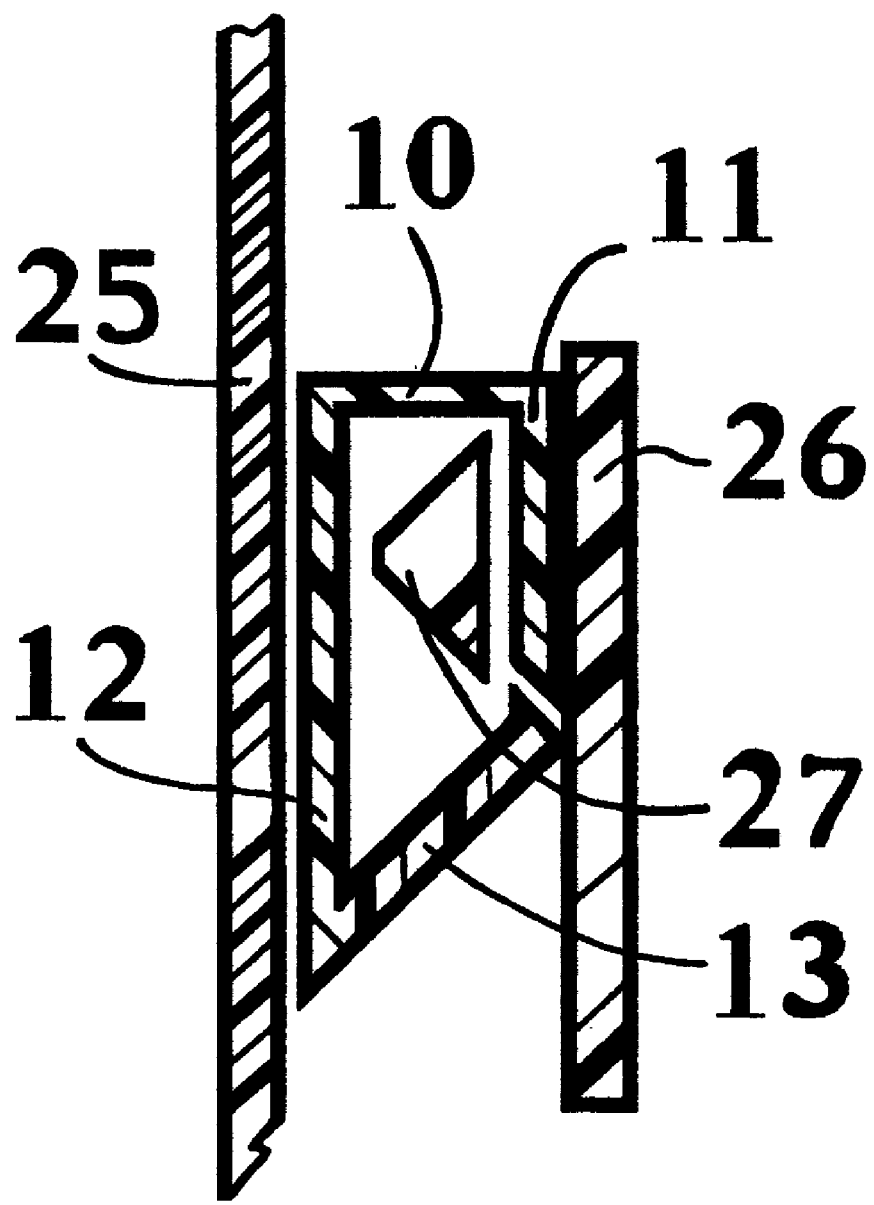
FIG. 18 is an alternate version of FIG. 17 showing another way the bar's outwardly sloping edges in the middle of the bar could be shaped.

Other features that help the said locking clip more easily slide between the shoe upper 25 and said bar is the acute angle in which the back 12 of said clip forms with the flexing side 13. Additionally, the convex, tubular shape of front 20 of said bar helps said clip slide past the bar when attaching the shoe ornament and said clip to said shoe upper 25 and said bar as shown in FIGS. 15 and 16. Similarly, the shape of the front 20 of said bar helps said locking clip's flexible side 13 move past said bar when one pushes said flexible side 13 inwards to unlock said clip and slide said clip up off said bar in the reverse direction of the application of said locking clip as can be envisioned in FIG. 16. In FIG. 18 there is shown an alternate shape for the front 27 of said bar that involves two outwardly sloping sides that accomplish the same benefits as afforded with the convex, tubular front 20 for said bar.

The sides 21, 22, 23, 24 of the ends of said bar are shown roughly forming cubes in FIG. 7 to facilitate attachment of said bar to the shoe upper via adhesives, sewing, brads, or other means. The ends of said bar also help raise the front side 20 of said bar off the surface of the shoe upper 25 as is shown in the cross section view in FIG. 15.

It is therefore understood that although the present invention has been specifically disclosed with the preferred embodiment and examples, modifications to the design concerning shape and sizing may be apparent to those skilled in the art, and such modifications and variations are considered to be within the scope of the invention and the appended claims.

In the following claims the invention is defined.

| Part Number | Part Name |
|---|---|
| 10 | Top side of the locking clip |
| 11 | Front side of the locking clip |
| 12 | Back side of the locking clip |
| 13 | Flexing side of the locking clip |
| 20 | Front side of the center of the bar |
| 21 | Front side of the cuboidal end of the bar |
| 22 | The side that is the end of the bar |
| 23 | The side perpendicular to end and back of bar |
| 24 | Back side of the bar |
| 25 | Shoe upper |
| 26 | Shoe Ornament |
| 27 | Alternate shape of the front of the bar |

I claim:

1. A shoe ornament locking clip apparatus for securely attaching a shoe ornament to a shoe comprising:
   a: a bar with
   a middle section that has a roughly convex surface on a side that faces said shoe and
   ends that are roughly cuboidal in shape to facilitate attachment to said shoe;
   b: a clip with
   a front side of said clip that the shoe ornament attaches by attachment means, said front side having a beveled edge on an inner aspect of a free end of said front side;
   a top side of said clip that separates said shoe ornament and said front side of said clip from a back side of said clip, and engages the middle section of the bar to hold the shoe ornament on the shoe;
   wherein said backside of said clip that is attached to said top side of said clip and is also attached to a flexible side of said clip at an acute angle;
   wherein said flexible side of said clip has a beveled edge on an outer aspect of a free end of said flexible side that prevents said shoe ornament and said clip from easily being accidentally dislodged upwards and off the bar by pressing against said beveled edge of the front side of said clip and said ornament when said clip is forced upwards against the bar.

2. The shoe ornament locking clip apparatus of claim 1 wherein said roughly convex surface of the middle section of the bar is convex tubular in shape.

3. The shoe ornament locking clip apparatus of claim 1 wherein said roughly convex surface of the middle section of the bar comprises two outwardly sloping sides.

* * * * *